United States Patent [19]

Roux

[11] Patent Number: 4,630,979
[45] Date of Patent: Dec. 23, 1986

[54] CARTRIDGE TOOL LOCKING AND UNLOCKING DEVICE FOR TOOLHOLDERS

[75] Inventor: Jean-Pierre Roux, Saint Etienne, France

[73] Assignee: Berthiez-Saint-Etienne, Saint Etienne, France

[21] Appl. No.: 735,044

[22] Filed: May 17, 1985

[30] Foreign Application Priority Data

May 17, 1984 [FR] France ............... 84 07671

[51] Int. Cl.⁴ .................. B23B 31/26; B23B 31/30
[52] U.S. Cl. .................... 409/232; 82/25; 279/4; 408/239 R
[58] Field of Search ................... 409/231–234; 82/1.2, 1.3, 1.4, 2 E, 24 R, 25, 36 A, 36 B; 279/4; 60/581, 594; 408/239 R; 407/46, 101

[56] References Cited

U.S. PATENT DOCUMENTS 4,036,484 7/1977 Schneemann ............... 279/4 X
4,135,418 1/1979 McCray et al. ........... 408/239 R X

FOREIGN PATENT DOCUMENTS 3306823 8/1984 Fed. Rep. of Germany .......... 279/4

Primary Examiner—Gil Weidenfeld
Assistant Examiner—Steven C. Bishop
Attorney, Agent, or Firm—Lalos, Keegan & Kaye

[57] ABSTRACT

Locking and unlocking device for cartridge-type tools used in a toolholder mounted on a machine tool ram comprises transmission apparatus (20) connected to control apparatus (24) and arranged to slide axially within a rotating block (23), said transmission apparatus carrying a pin (19) operable to selectively actuate any of several secondary plungers (12) slidably mounted in hydraulic cylinders (11) provided in the toolholder (3), said cylinders being connected via ducts (10) to hydraulic chambers (8) in the top of the toolholder, and said cartridge tools (6) being carried in hollows (5) therein.

8 Claims, 9 Drawing Figures

CARTRIDGE TOOL LOCKING AND UNLOCKING DEVICE FOR TOOLHOLDERS

This invention concerns a device for locking and unlocking machine toolholder tool cartridges.

When changing a tool on a vertical boring machine it has heretofore been required to remove in an automatic way a very bulky toolholder weighing several tens of kilograms. More recently, a technique has been introduced whereby the toolholder is retained in the machine during tool changing and carries cartridge-type tools of considerably smaller dimensions than the toolholder itself, enabling easy tool replacement.

This arrangement affords a very great number of tool points with the same given tool changer volume. However, this solution runs into numerous problems concerning its implementation, especially as concerns locking the cartridge into the toolholder.

It in fact requires that a power source be provided on the toolholder to drive the cartridge locking/unlocking means, which power source can be either integrated with or external to the toolholder.

Moreover, it is necessary to mount several tool cartridges on the same toolholder.

This invention is directed to providing a device enabling the above-stated problems to be solved.

The device according to the invention comprises a transmission means linked to control means and mounted to slide axially in a rotating block of the ram, said transmission means including a pin operable to selectively actuate one of the second plungers mounted slidably in one of the hydraulic cylinders arranged in the toolholder and connected via a duct to a hydraulic chamber provided in the top part of the tool cartridge compartments, said chamber containing a fluid which acts upon one of the first plungers controlling the locking and unlocking of the cartridge.

This arrangement enables each of the tool cartridges in the toolholder to be selectively locked or unlocked, the controlling means therefor being independent of one another. Substitution of one cartridge for another is carried out by the rotating spindle which rotatively drives the unit as a whole so that the pin matches up with the second plunger.

Accurate positioning of the pin is obtained thanks to the spindle position sensor provided for milling toolholder change purposes.

Other features and advantages of the invention will be more readily apparent in reading the following description of several embodiments with reference to the appended drawings in which.

Figure 8:
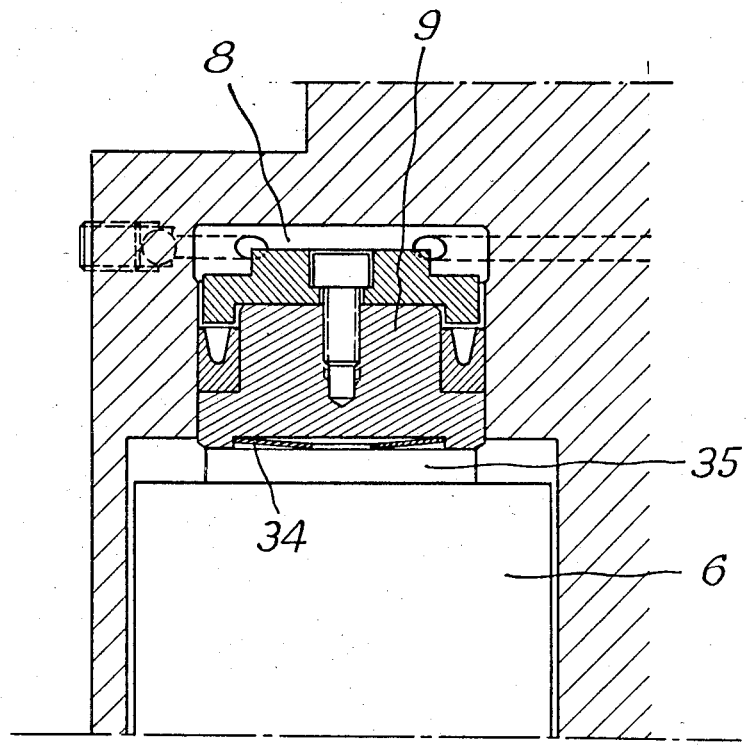

and FIG. 8 is a cutaway view of an alternative embodiment of the plunger and spring assembly.

Figure 1:
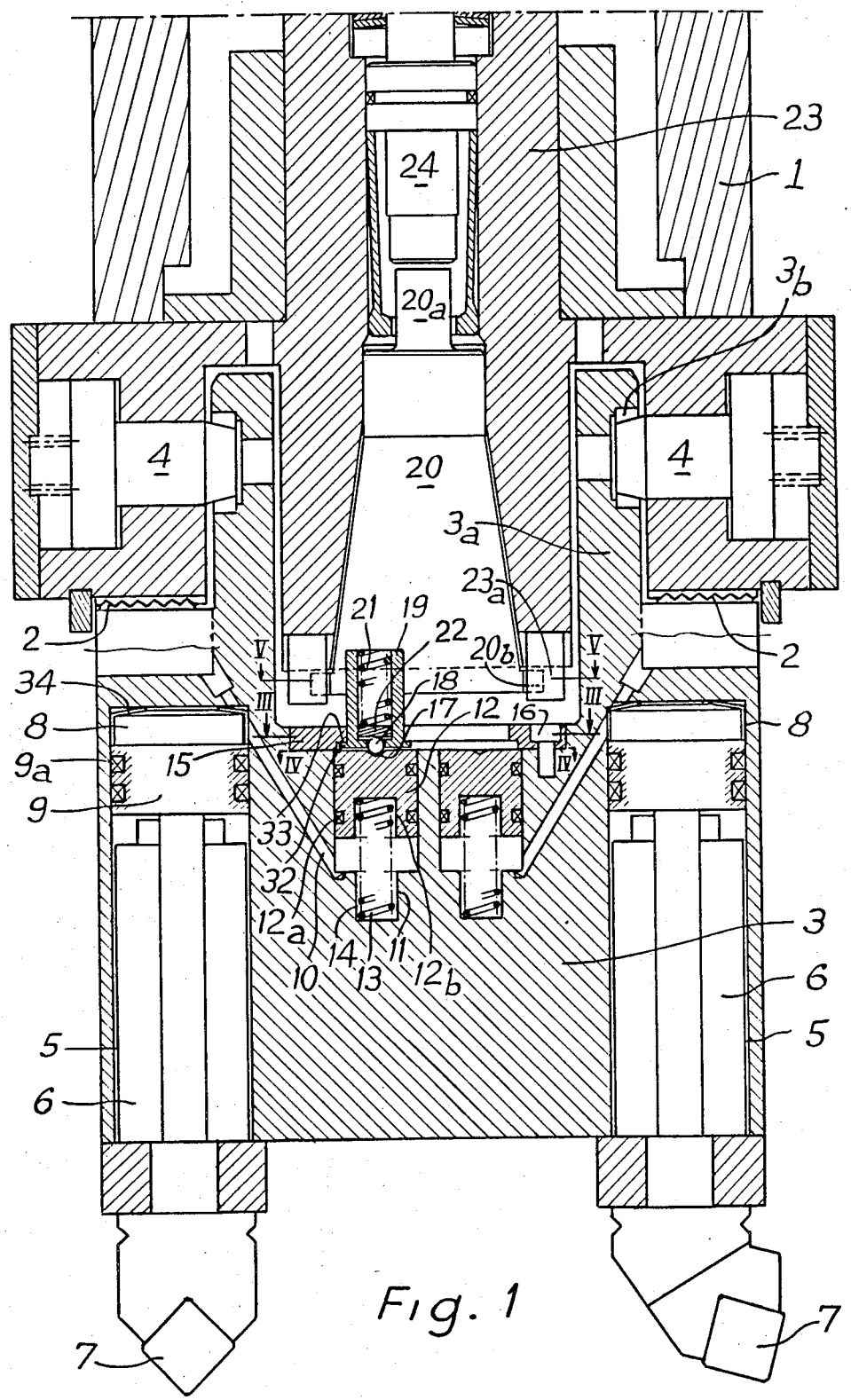
FIG. 1 is a longitudinal cutaway view of a toolholder fitted with a tool cartridge locking/unlocking device according to the invention.

FIG. 1 shows the bottom part of the body 1 of a machine tool ram. Said ram is shown mounted vertically in the illustration but could be mounted in various other positions as required.

The base of ram body 1 includes geared rack means 2 engaging with matching serrated means on the top face of a turning toolholder 3 which is extended in the form of a collar 3a with accommodations 3b for fixing means 4 engaged therein and mounted slidably in the base of body 1.

The toolholder 3 features two hollows 5 in which are fitted two cartridge-type tools 6 each having a cutting means 7 at its base.

Figure 3:
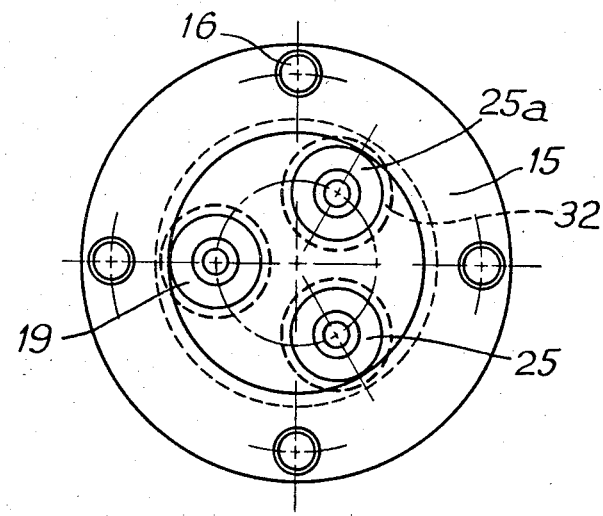
FIG. 3 is a schematic cross section taken along line III—III of FIG. 1.

The top part of the hollows 5 terminates in a hydraulic chamber 8 bounded by the head of the hollow 5 and by a first plunger 9 slidably mounted in said hollow to lock and unlock the tool cartridge 6, said plunger being equipped with sealing means 9a. Each of the chambers 8 is connected via a duct 10 with the base of a cylinder 11 containing a slidably mounted second plunger 12 equipped with sealing means 12a. Plunger 12 is subjected to the action of a helical spring 13 one end whereof is engaged in a compartment 14 being an extension of cylinder 11 and the other end whereof is engaged in a recess 12b in plunger 12, said spring 13 pushing the plunger 12 against an edge of an annular plate 15 (FIGS. 1 and 3) attached to the top of the toolholder 3 with screws 16.

The faces of plungers 12 each have a detent 17 operable to catch a ball 18 on a pin 19 fitted to the base of a conical transmission means 20, said ball being operable to selectively engage with said detent when impelled by a spring 21 acting through a plate 22.

The conical or tapered transmission means 20 is slidably mounted in a rotating block 23 which specifically may be the milling spindle installed on the machine, said rotating block 23 being rotatable within the body 1 of the ram.

Also slidably mounted in said rotating block 23 is a rod 24 acting upon the top end 20a of transmission means 20 and linked to control means normally used to release milling toolholders.

The base of block 23 is provided with fingers 23a engaging with corresponding openings 20b in the bottom of transmission means 20 to rotatively drive and axially guide said transmission means.

Figure 4:
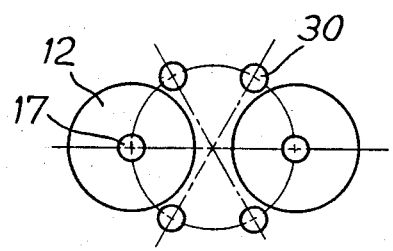
FIG. 4 is a schematic cross section taken along line IV—IV of FIG. 1.
Figure 5:
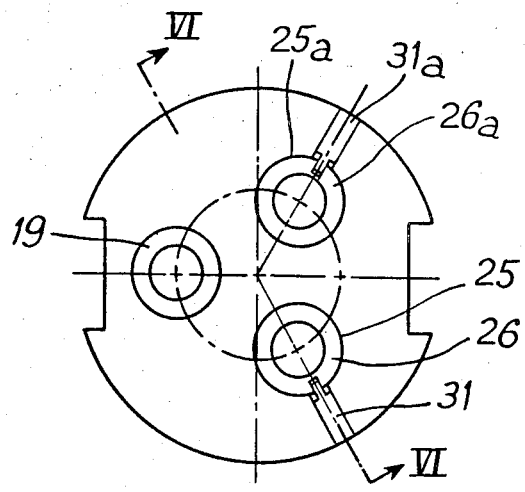
FIG. 5 is a schematic cross section taken along line V—V of FIG. 1.
Figure 6:
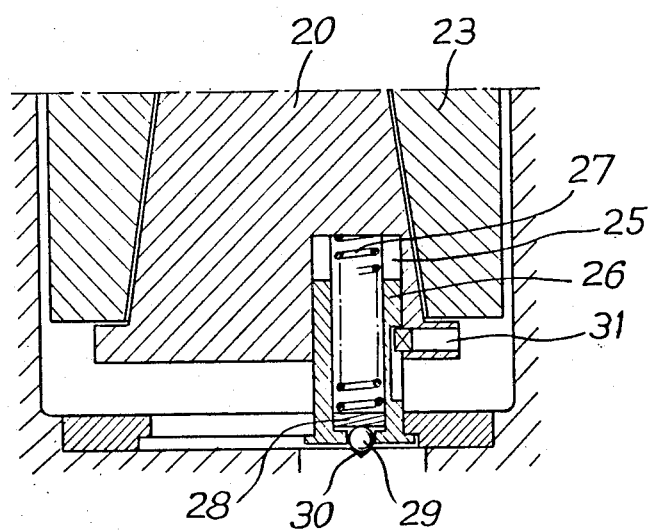
FIG. 6 is a schematic cross section taken along line VI—VI of FIG. 5.

Said transmission means 20 further includes two cylindrical compartments 25, 25a (FIGS. 5 and 6) in which are slidably mounted two plungers 26, 26a spring-loaded by springs 27 pushing against the heads of cylindrical compartments 25 and 25a at one end and against a plate 28 acting on a ball 29 at the other end, said ball engaging with one of the detents 30 provided in the top of the toolholder 3 (FIGS. 4, 5 and 6). Plungers 26, 26a are axially guided by keys 31, 31a on the transmission means 20 and, like pin 19, have an edge 32 bearing against a shoulder 33 of annular plate 15.

Plungers 25 and 25a serve to stabilize the conical transmission means 20 when the toolholder 3 is removed from the machine.

A spring 34 is provided in the head of each chamber 8 (FIG. 1) against which plunger 9 can come to rest when the device and its power source are turned off.

According to another embodiment, illustrated in FIG. 8, the spring 34, actually a spring washer, is laid between the plunger 9 and a control rod 35 for releasing the tool cartridge 6.

The operation of the device according to the invention described in the foregoing will now be explained.

Beginning with the transmission means 20 in the position shown in FIG. 1, in order to release the cartridge 6, which is in locked position in this configuration, the rotating block 23 must be rotatively driven, thus rotatively driving transmission means 20 to align pin 19 with plunger 12 and engage ball 18 in the plunger detent.

If the rotating block 23 is in fact a milling spindle, exact positioning of pin 19 is obtained by means of the spindle sensor designed for milling toolholder changeover operations.

Figure 2:
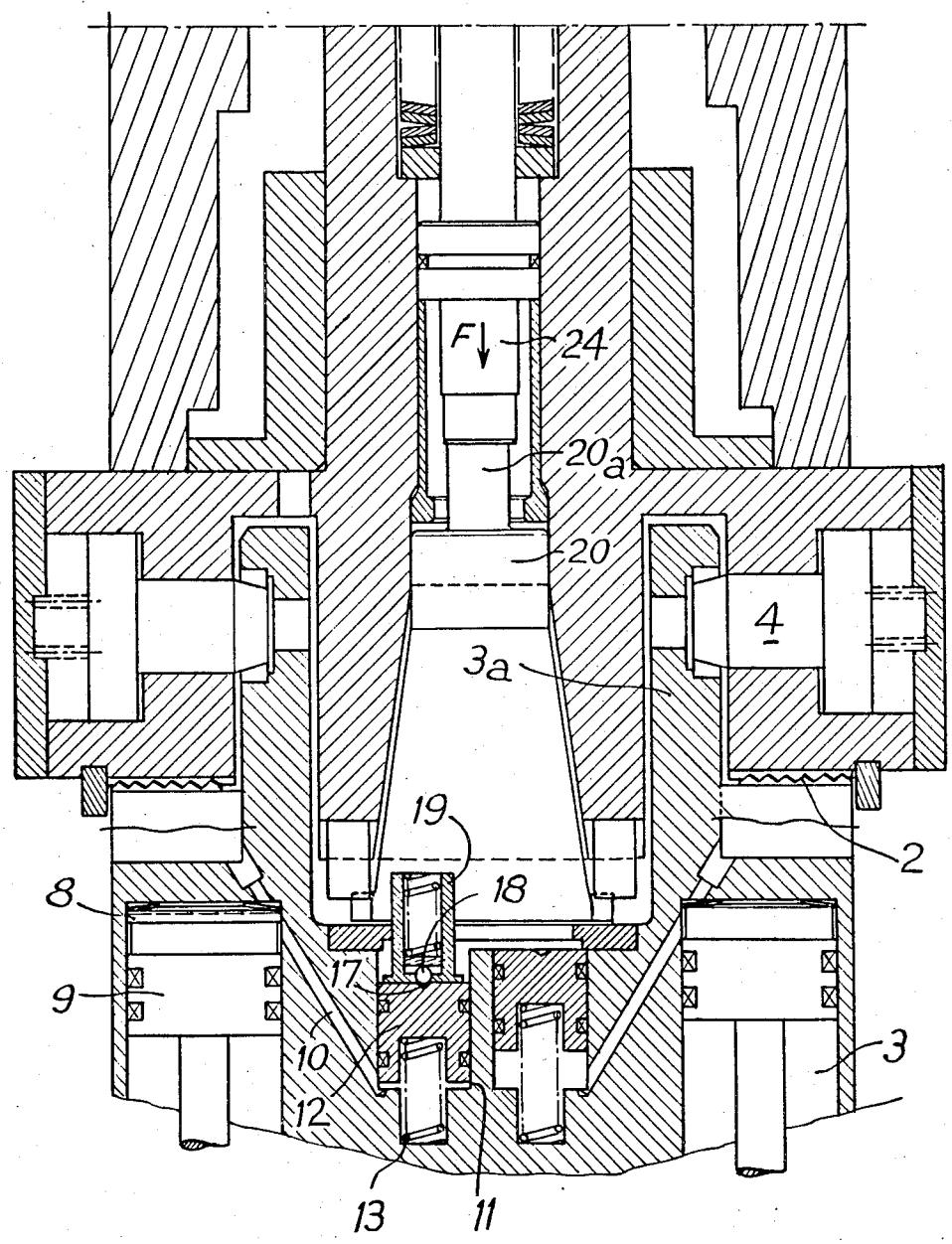
FIG. 2 is a similar view showing the device at the stage when the plunger is positioned to unlock or release the cartridge.

Next, rod 24 (FIG. 2) is actuated by a machine control such that it moves in the direction of arrow F and pushes down transmission means 20, together with pin 19, and the latter in turn pushes plunger 12 into cylinder 11, against spring 13.

The liquid compressed in cylinder 11 by plunger 12 flows out through duct 10 to chamber 8, driving plunger 9 to release tool cartridge 6.

As transmission means 20 moves back up, entraining pin 19 and plunger 12, the liquid flows back from chamber 8 to cylinder 11 and plunger 9 resumes its initial position depicted in FIG. 1, allowing a new tool cartridge 6 to be inserted in locked position.

The tool cartridge 6 has not been described in greater detail since several different types are available which can be used with the toolholder device according to the invention, all of said cartridges including their own built in means for locking into hollow compartments 5.

Figure 7:
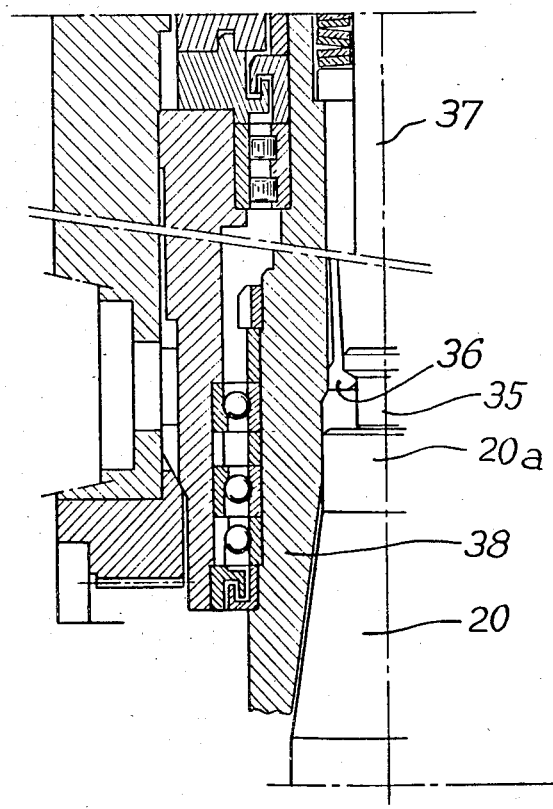
FIG. 7 is a longitudinal cutaway view of another embodiment of the control means.

Referring now to FIG. 7, another embodiment is shown in which the top 20a of transmission means 20 extends to form a collar 35 which is tightly held by a clamp 36 attached to a rod 37 mounted in a borehole in spindle 38.

Figure 2A:
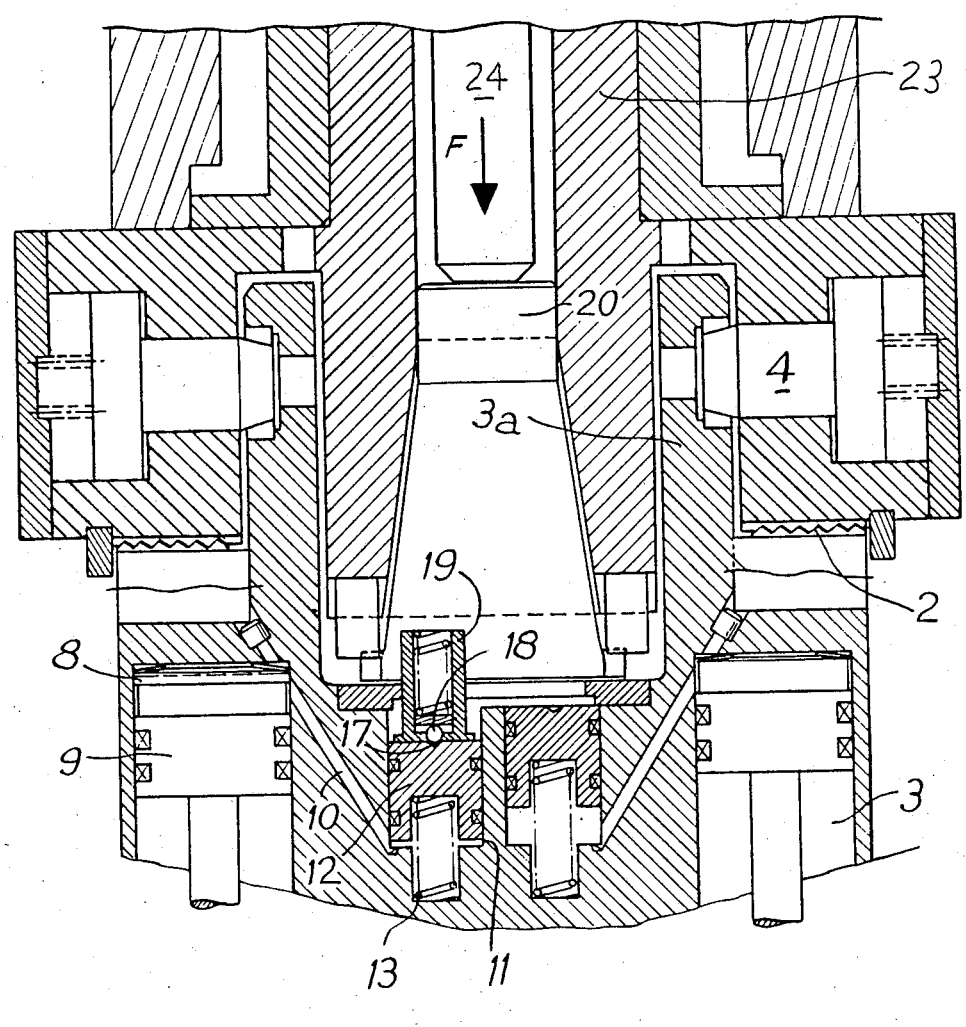
FIG. 2a is a view similar to FIG. 2 showing an embodiment in which the rotating block and transmission means comprise a single sliding and rotating unit.

Alternatively, in the event the machine ram is not provided with a milling spindle, rotating block 23 and transmission means 20 can be replaced by a single sliding and rotating unit. This embodiment is illustrated in FIG. 2a in which units 24 and 20 are coupled to form a single sliding and rotating unit and block 23 is stationary.

Obviously, a number of modifications to the devices specified herein will occur to those skilled in the art without departing from the scope and spirit of the invention.

What is claimed is:

1. Device for locking and unlocking tool cartridges in a lathe or vertical boring machine toolholder mounted on a ram of a machine tool, wherein said cartridges are inserted into hollow compartments of the toolholder, said compartments comprising top parts that include first plungers for actuating locking and unlocking of said cartridges, said device comprising transmission means linked to control means and mounted to slide axially in a rotating block of said ram, said transmission means including a pin operable to selectively actuate any of several second plungers slidably mounted in one of several hydraulic cylinders arranged in the toolholder and connected via a duct to a hydraulic chamber provided in said top parts of said tool cartridge compartments, said chamber containing a fluid which acts upon one of said first plungers actuating the locking and unlocking of the tool cartridges.

2. Device according to claim 1, wherein said transmission means comprises a conical unit including a top part that is operable to contact a control rod slidably mounted in said rotating block of said ram.

3. Device according to claim 1, wherein said pin comprises a ball impelled by spring means to engage with a detent provided in a face of one of said several second plungers.

4. Device according to claim 1, wherein each of said second plungers is slidably mounted in one of said hydraulic cylinders of said toolholder in spring loaded fashion against a spring pressing against a head of said cylinders.

5. Device according to claim 1, wherein said hydraulic chamber in each of said compartments receiving said first plungers is provided with spring means against which each of said first plungers bears when at rest.

6. Device according to claim 2, wherein said conical transmission means further includes a base with plunger compartments in which are slidably mounted third plungers spring-loaded to bear against said toolholder.

7. Device according to claim 2, wherein said conical transmission means includes a top provided with a collar operable to couple to a clamp attached to a control rod mounted in a borehole in a spindle.

8. Device for locking and unlocking tool cartridges in a lathe or vertical boring machine toolholder mounted on a ram of a machine tool, wherein said cartridges are inserted into hollow compartments of the toolholder, said compartments comprising top parts that include first plungers for actuating locking and unlocking of said cartridges, said device comprising transmission means linked to control means and mounted to rotate and slide axially in said ram, said transmission means including a pin operable to selectively actuate any of several second plungers slidably mounted in one of several hydraulic cylinders arranged in the toolholder and connected via a duct to a hydraulic chamber provided in said top parts of said tool cartridge compartments, said chamber containing a fluid which acts upon one of said first plungers actuating the locking and unlocking of the tool cartridges.

* * * * *